Oct. 20, 1936. W. E. MOLINS Re. 20,138
METHOD AND MACHINE FOR MAKING FILTER PLUGS OR WADS FOR CIGARETTES
Original Filed July 6, 1934 3 Sheets-Sheet 1
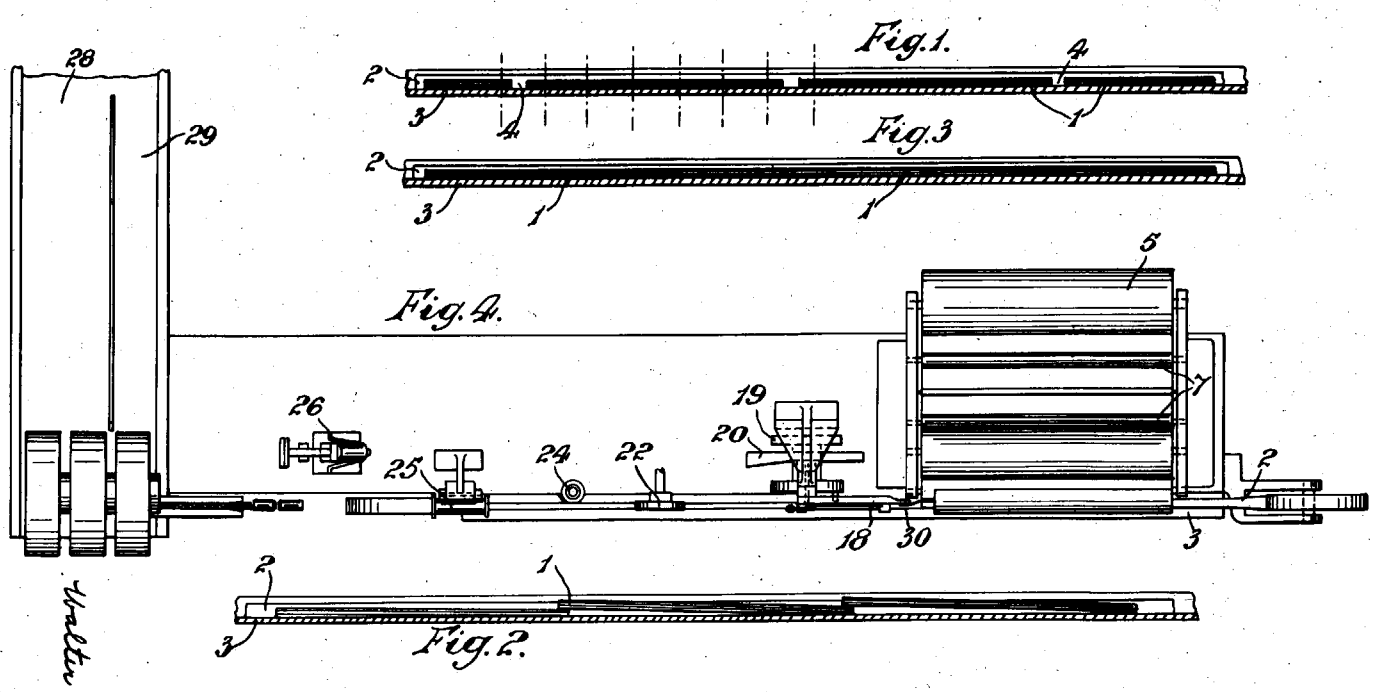
Walter Everett Molins
INVENTOR
By Watson, Cole, Morse & Grindle
Attorneys

METHOD AND MACHINE FOR MAKING FILTER PLUGS OR WADS FOR CIGARETTES

Original Filed July 6, 1934 3 Sheets-Sheet 2

Walter Everett Molins
INVENTOR

By Watson, Coit, Morse & Grindle
Attorneys

METHOD AND MACHINE FOR MAKING FILTER PLUGS OR WADS FOR CIGARETTES

Original Filed July 6, 1934 3 Sheets-Sheet 3

Walter Everett Molins
INVENTOR

By Watson, Coit, Morse & Grindle
Attorneys

Reissued Oct. 20, 1936

Re. 20,138

UNITED STATES PATENT OFFICE 20,138

METHOD AND MACHINE FOR MAKING FILTER PLUGS OR WADS FOR CIGARETTES

Walter Everett Molins, deceased, late of London, England, by Molins Machine Company Limited, assignee, Deptford, London, England Original No. 1,988,805, dated January 22, 1935, Serial No. 734,042, July 6, 1934. Application for reissue March 21, 1936, Serial No. 70,175. In Great Britain July 4, 1933

44 Claims. (Cl. 93—1)

This invention is for improvements in filter plugs or wads, for example, for use in cigarettes at that end of the cigarette which is to be placed in the mouth, and to a method of and means for manufacturing such plugs.

The filter plugs may be manufactured on a machine resembling a continuous rod cigarette making machine in a manner which will be described in more detail hereinafter.

Some of the materials used for making filter plugs are obtainable in sheets or rolls, and have creped or corrugated surfaces, and it is desirable that the creping should be parallel to the longitudinal axis of the finished plugs, in order that the plugs shall have a certain amount of resiliency to ensure a secure fit in the end of the cigarette or within a wrapper which is placed around the plug and to provide a free passage for smoke through the plug and to enable the material to be more easily formed into plugs of any desired cross-section.

One form of material suitable for the present purpose is known as cellulose wadding, and this material is creped during its manufacture so that it is extensible lengthwise of the sheet or roll and comparatively non-extensible transversely. Other materials suitable for the manufacture of plugs are similar in this respect.

According to the present invention, there is provided a method of forming filter plugs or wads (e. g. for use with cigarettes) from compressible material (e. g. crepe paper or cellulose wadding) which is extensible transversely of its length wherein the longitudinal edges of the material are compressed to form or partly form the plug or wad to the required cross-section. The plugs or wads may be formed from a succession of strips which may be wrapped in a tubular wrapper to comprise a rod composed of a wrapper within which strips of filter material are disposed at intervals, before the plug lengths are severed from the rod so formed.

Further, according to the present invention, there is provided a machine for producing filter plugs or wads in accordance with the method above set forth, comprising means to sever transverse strips from a sheet or roll of material, and to compress the longitudinal edges of the strips, means to deliver said strips at intervals onto a conveyor, and means to sever the strips into lengths. The conveyor means may comprise a continuous web of wrapping material and means may be provided to form and secure the wrapping material into a tubular wrapper about the strips of material.

Again, the invention comprises filter plugs or wads, for example, for use with cigarettes, made in accordance with the method herein set forth.

The invention will be more particularly described with reference to the accompanying drawings, in which:

Figure 1 shows diagrammatically one method according to the invention;

Figure 2 is a diagrammatic view showing a modified form of Figure 1;

Figure 4 shows diagrammatically a plan view of a machine for carrying the method according to the invention into effect;

Figure 5 is a side elevation of Figure 4;

Like references refer to like parts throughout the specification and drawings.

Figure 3:
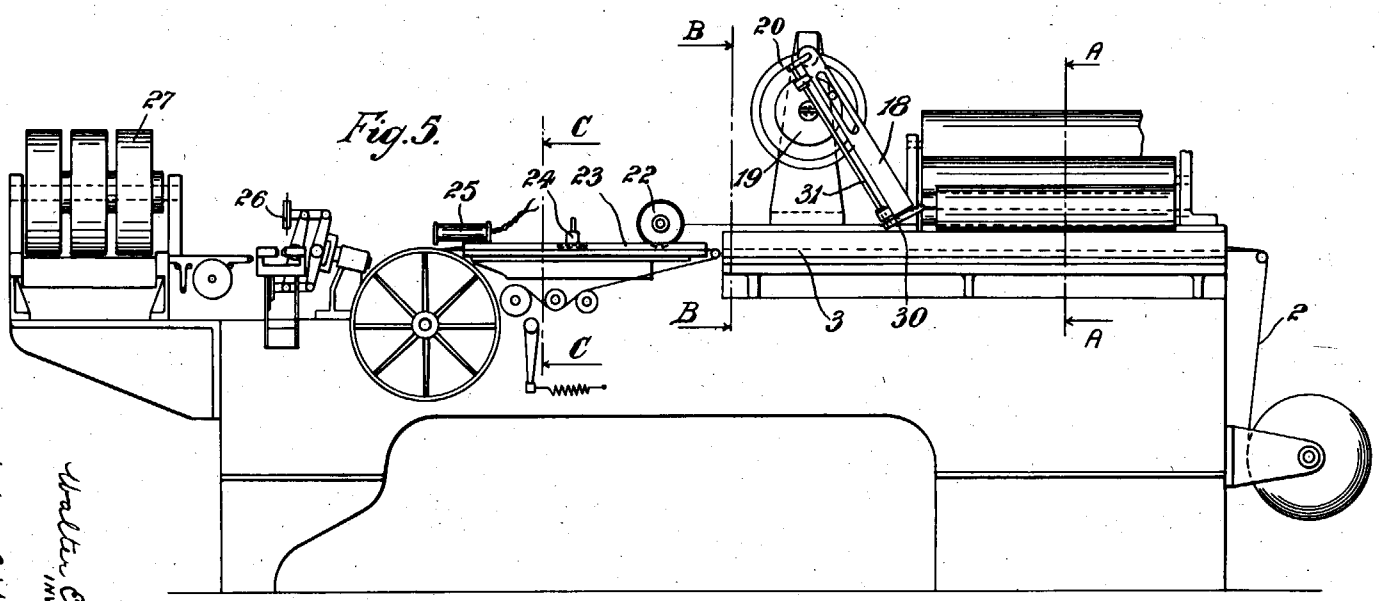
Figure 3 shows a further modified form of Figure 1.
Figure 8:
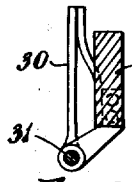
Figure 8 shows a plan view of the gripping device shown in Figures 4, 6, and 7.

Referring to the drawings, Figure 1 shows diagrammatically one method of carrying the invention into effect, and according to this method the strips 1 of filter material are placed on a conveyor, which in the drawings is shown as a continuous paper web 2 arranged to move on the bottom of the trough 3. In this form of the invention the strips 1 are spaced apart as shown at 4, Figure 1.

Referring to Figure 2, the strips 1 are again deposited on the paper web 2, but in this instance the forward end of one strip is placed on the rearward end of the preceding strip, so that when the wrapper 2 is folded about the strips a substantially continuous rod is formed.

In the form of the invention shown in Figure 3, the strips of filter material are placed together so that the rearward end of one strip substantially abuts against the forward end of the next succeeding strip.

For convenience in referring broadly to the method of disposing the strips 1 of filter material on the conveyor and feeding the same with the conveyor, these strips are described as disposed in end to end relation or as being fed endwise in succession, it being understood that these terms are intended as sufficiently comprehensive to describe any one or all of the arrangements shown in Figures 1, 2, and 3. In other words, the strips may be said to lie in end to end relation whether they overlap slightly, directly abut, or are arranged in spaced relation.

Referring to Figures 4 to 7, the material from which the strips 1 are cut is fed from a reel 5, and is passed over a table 6 and beneath rollers 7 which are arranged to retain the material in contact with the table 6, and feed in towards the knives 9 and 10. A retaining plate 8, provided with fingers which extend to a point in close proximity to the point at which the knife edges cooperate to sever the web, is arranged to hold the web onto the table while it is being cut by the knives 9 and 10 and to prevent the web from stretching lengthwise during the cutting operation so that the severed strips are all of substantially the same width. Instead of the rotary knife 9 a reciprocating knife may be used or a pair of reciprocating or rotary knives may be used.

The material from which the strips are cut is built up of a number of plies, and it is often found when using crepe paper that it is necessary in order to roll and handle the material in a satisfactory manner, to provide a backing strip which usually comprises a strip of paper. As this paper backing strip is not included in plugs, it is necessary that it shall be removed before the strips are fed onto the conveyor or wrapping material.

Figure 6:
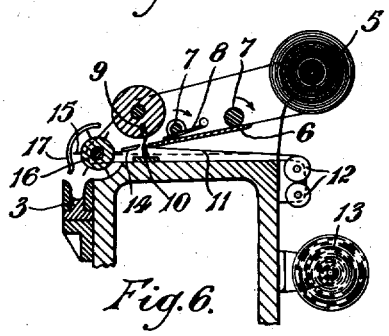
Figure 6 is a sectional end elevation taken on the line A—A, Figure 5.
Figure 7:
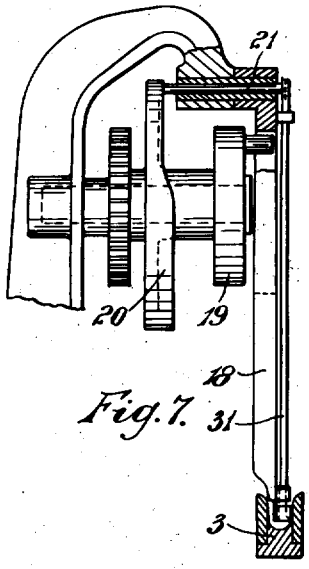
Figure 7 is an end elevation, partly in section, taken on the line B—B, Figure 5.

It is preferable that the backing strip should be removed out of engagement with the filter material at the very latest possible moment, in order that it may exert its controlling influence as long as possible, and by referring to Figure 6, it will be seen that the backing strip 11 is parted from the filter material by passing it round the edge of the table 6 just before the knives operate to sever a strip from the web. The backing strip then passes over the rollers 12 and is rewound into a reel 13 by any suitable mechanism, of known construction.

Figure 11:
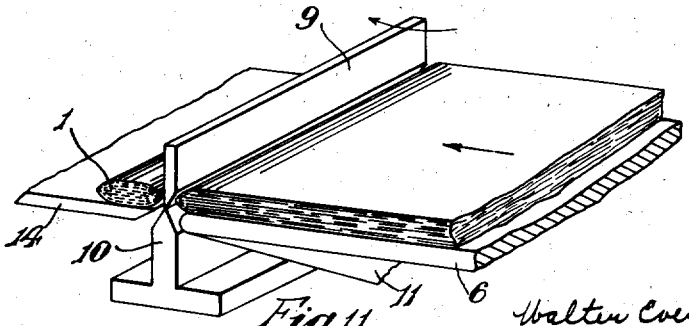
Figure 11 is a perspective view showing how the filter material is shaped during the severing operation.

The web of filter material is extensible in a lengthwise direction and on referring to Figure 11 it will be seen that the knives 9, 10 sever strips from the web transversely of its length. Owing to the fact that the web is extensible in a lengthwise direction, the action of the knives causes the longitudinal edges of the severed portion to be drawn together as shown clearly in Figure 11. The pressure exerted by the knives on opposite sides of the web causes the top and bottom edges of the strip to adhere to each other so that each severed strip is formed as seen from Figure 11.

Figure 10:
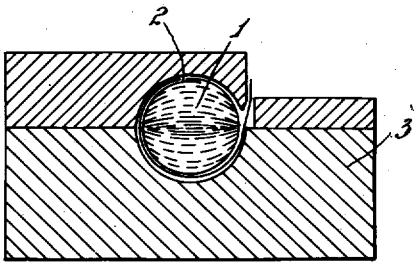
Figure 10 is a sectional elevation to an enlarged scale taken on the line C—C, Figure 5, and shows the strip of filter material in position after being wrapped.
Figure 9:
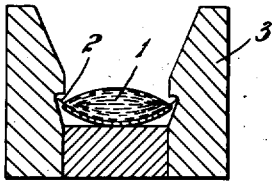
Figure 9 is a sectional elevation to an enlarged scale taken on the line B—B, Figure 5, and shows the strips of filter material in position before being wrapped.

When the web of material is of less thickness than the cross-sectional dimensions of the plugs to be formed, a strip is cut in the manner illustrated in Figure 11, the cross-section of the severed strip being of substantially oval or elliptical formation. The oval or elliptically formed strips may thereafter be compressed, for example, by pressure exerted along the major axis of the ellipse, so that the material assumes a substantially circular cross-section as shown in Figure 10. If, however, it is desired to have a plug of substantially oval or elliptical cross-section it is not necessary to subject the strips to any appreciable deformation or compression after the severing operation, although it is to be understood that if it is desired to further compress the strips into the oval or elliptical shape, this operation may be performed and is within the scope of the invention.

It will be seen that if the web or material is of a thickness approximating to the cross-sectional dimensions of the plug to be formed, by cutting a suitable length from the web the knives may be arranged to form the material into substantially circular cross-section. In this case, also, the severed strips of material may or may not be subjected to further compression as desired.

It is not essential that the knives should have specially formed edges in order to form the strips as just described, but it is found that when using thick or relatively blunt knives, better results are obtained.

Again, it is found that knives having shaped (e. g. rounded) edges are suitable for the purposes of carrying the invention into effect, but of course, the pressure would have to be sufficient to separate the strip from the web.

The strips 1 of filter material after being severed from the web by the knives 9 and 10, pass over a plate 14, and are delivered into the flutes 15 of a rotatable wheel 16. The wheel 16 is disposed above the trough 3 of the machine so that when a strip 1 has been conveyed by the wheel through approximately 180° it is in alignment with the trough and above the same. A guide 17 is provided to prevent the strips 1 from being ejected from the flutes of the wheel 16 as it is being rotated to the position at which the strips are delivered into the trough of the machine.

In the machine illustrated, a web 2 of cigarette paper 4 is arranged to move at the bottom of the trough 3 in a manner similar to that in which the paper web is arranged in a cigarette making machine of the continuous rod type, and the strips 1 which are fed into position above the trough 3 by the wheel 16 are gripped by a gripper 18 which removes the strips from the wheel and deposits them upon the moving paper web 2. The gripper 18 is arranged so that it imparts to the strips 1 a movement in the direction in which the paper web 2 is travelling and the gripper is preferably arranged so that at the instant the strip 1 is delivered onto the web 2, it has a velocity substantially equal to that of the paper web 2 to which it is being delivered.

The gripper 18 is driven from the main drive of the machine and is arranged to operate in synchronism with the cutting mechanism 26. The movement in the direction of the web 2 is imparted to the gripper by means of an eccentric disc 19. A cam 20 is arranged to operate a rod 21 which in turn pivots a bar 31 and operates the movable jaw 30 of the gripper 18 at the instant at which the strip 1 is to be gripped in order to remove it from the wheel 16, and again, at the moment at which it is to release the strip in order to deposit it upon the paper web 2.

When the strips 1 are deposited upon the paper web 2 the loaded web may be carried beneath a compression wheel 22, which compresses the strips of filter material, and then through forming mechanism 23 which forms the filter material and wrapper into the desired cross-section and folds the wrapper into tubular form about the filter material. An adhesive applying device 24 is provided to apply adhesive to the wrapping material, whereby the wrapper may be secured about the strips. The rod so formed then passes beneath a heating element 25 which is arranged to dry the adhesive securing the edges of the wrapper and the rod then passes to cutting mechanism 26, which is arranged to sever the wrapped strips into lengths.

The length severed from the rod formed by the wrapped strips or from the strips when they are not wrapped, may be of a length sufficient to provide a number of individual plugs or wads for use with cigarettes, and in such case the lengths would be again severed at some other time, such for example, as just prior to their assembly with a cigarette. Again, if desired, the cutting mechanism 26 may be arranged to sever from the rod, lengths of plug which are of the correct lengths for use with cigarettes.

It will be seen that in each form of the invention there is a point at which the rearmost end of one strip is adjacent to the foremost end of the next successive strip, and as this is the case, when the rod is severed a length will be cut which contains two short ends of filter material. This point will be better appreciated by referring to Figures 1, 2, and 3 in which the vertical chain lines represent the points at which the rod is severed. It is desirable that the length having these short ends should be removed from the normal product of the machine in order that they do not become included at a later stage in a cigarette.

In order to remove the portions of the rod just referred to, means may be provided operating in connection with the deflector element for deflecting the severed lengths out of the rod line, such means being arranged and timed so that the lengths including the short ends of filter material are removed and deposited at a point different from the point or points to which the normal product of the machine is or are delivered. A suitable device for performing this operation is described in French Patent No. 748,158 and is illustrated diagrammatically at 27, see Figures 4 and 5.

The device shown at 27 comprises three deflector drums similar to those shown in said patent and one of the drums is timed to remove those lengths containing the short ends, in a manner similar to that in which the drum in the patent is arranged periodically to deflect a cigarette and deliver it to a weighing mechanism. The normal lengths are delivered onto a suitable conveyor such as 28, and if desired, the conveyor may be divided as shown in Figure 4 by the provision of a bar 32, and the lengths containing the short ends may be delivered to the portion 29 of the conveyor 28, from which they may be collected by the machine operator or, if desired, the defective lengths may be delivered into any suitable receptacle.

It will be appreciated that the apparatus described and illustrated in Figures 4 to 7 merely shows one way of carrying the method according to the invention into effect, and the various details of the mechanism may be altered without in any way departing from the spirit of the invention.

Further, if desired, means may be provided to automatically control the length of material being cut from the web or sheet in order to control the density of the finished plug or wads. Such means do not form part of the present invention and are not, therefore, fully described herein, but it would be sufficient for this purpose to alter the speed of feeding of the web to the knives 9 and 10.

Having thus described the invention, what is claimed as new and desired to be secured by Letters Patent is:

1. A method of forming filter wads from strips of compressible material which are extensible transversely of their length, by compressing the longitudinal marginal edges of the material to form the wads to the required cross-section and thereafter severing lengths from said strips.

2. A method of forming filter wads from strips of compressible material which are extensible transversely of their length, by compressing the longitudinal edges of the material to partly form the wads to the required cross-section, completing the formation of the wads by lateral compression of the strips and thereafter severing lengths from said strips.

3. A method of forming filter wads, by severing strips of compressible material from a stock and compressing the longitudinal marginal edges of the severed strips, said strips being extensible transverse of their length and thereafter severing lengths from the strips.

4. A method of forming filter wads, by severing strips of compressible material from a stock and compressing the longitudinal edges of the severed strips whereby the strips are given a curvilinear cross-section, said strips being extensible transversely of their length, arranging the strips lengthwise in succession, wrapping the strips in a tubular wrapper and severing lengths from the wrapped strips.

5. A method of forming filter wads, by severing strips of compressible material from a stock and compressing the longitudinal edges of the severed strips whereby the strips are given a curvilinear cross-section, said strips being extensible transversely of their length, arranging the strips lengthwise in succession, wrapping the strips in a tubular wrapper and severing lengths from the wrapped strips, and selecting and removing those severed portions containing portions of material from at least two different strips.

6. A machine for producing filter wads comprising in combination means to feed a succession of strips of compressible material in a lengthwise direction, means to compress the longitudinal marginal edges of the strips to form them to the desired cross-section, and means to sever lengths from said strips.

7. A machine for producing filter wads comprising in combination, means to feed a succession of strips of compressible material in a lengthwise direction, means to compress the longitudinal edges of the strips to form them to the desired cross-section, means to form and secure a tubular wrapper around the strips and means to sever lengths from the wrapped strips.

8. A machine for producing filter wads comprising in combination, means to feed a succession of strips of compressible material in a lengthwise direction, means to compress the longitudinal edges of the strips to form them to the desired cross-section, means to form and secure a tubular wrapper around the strips, means to sever lengths from the wrapped strips, and means to select and remove those severed lengths containing portions of material from at least two different strips.

9. A machine for producing filter wads comprising in combination, means to sever transverse strips of material from a stock and compress the longitudinal edges of the strips, means to deliver the strips in lengthwise succession on a conveyor and means to sever lengths from said strips.

10. A machine for producing filter wads comprising in combination, means to sever transverse strips of material from a stock and compress the longitudinal edges of the strips, means to deliver the strips in lengthwise succession on a conveyor, means to form and secure a tubular wrapper about the strips, and means to sever lengths from said strips.

11. A machine for producing filter wads comprising in combination, means to sever transverse strips of material from a stock and compress the longitudinal edges of the strips, means to deliver the strips in lengthwise succession on a conveyor, means to form and secure a tubular wrapper about the strips, means to sever lengths from said strips, and means to select and remove those severed lengths containing portions of material from at least two different strips.

12. A machine for producing filter wads comprising in combination, means to sever transverse strips of material from a stock and compress the longitudinal edges of the strips, means to deliver the strips in lengthwise succession on a continuously moving wrapper, means to impart to the strips a movement in the direction of movement of said wrapper, means to form and secure the wrapper about the strips and means to sever lengths from the wrapped strips.

13. A machine for producing filter wads comprising in combination, means to sever transverse strips of material from a stock and compress the longitudinal edges of the strips, means to deliver the strips in lengthwise succession on a continuously moving wrapper, means to impart to the strips a movement in the direction of movement of said wrapper, means to form and secure the wrapper about the strips, means to sever lengths from the wrapped strips, and means to select and remove those severed lengths containing portions of material from at least two different strips.

14. A machine for producing filter wads comprising in combination, a pair of cooperating severing elements to sever transverse strips of material from a stock and compress the longitudinal edges of the strips, a movable element to deliver the severed strips to a continuously moving wrapper, an element movable at substantially the same speed and in the direction of movement of said wrapper to impart a movement to said strips as they are delivered to the wrapper, folding elements operative to fold the wrapper about said strips, adhesive applying elements to secure said wrapper and a severing device to sever lengths from the wrapped strips.

15. A machine for producing filter wads comprising in combination, a pair of cooperating severing elements to sever transverse strips of material from a stock and compress the longitudinal edges of the strips, a movable element to deliver the severed strips to a continuously moving wrapper, an element movable at substantially the same speed and in the direction of movement of said wrapper to impart a movement to said strips as they are delivered to the wrapper, folding elements operative to fold the wrapper about said strips, adhesive applying elements to secure said wrapper, a severing device to sever lengths from the wrapped strips, and a selector element to select and remove those severed lengths containing portions of material from at least two different strips.

16. A machine for producing filter wads comprising in combination, means to sever transverse strips of material from a stock and compress the longitudinal edges of the strips, means to deliver the strips in lengthwise succession on a conveyor, means to form and secure a tubular wrapper about the strips, means to compress the strips to the required cross-section while moving endwise on the conveyor, and means to sever lengths from said strips.

17. A machine for producing filter wads comprising in combination, means to sever transverse strips of material from a stock and compress the longitudinal edges of the strips, means to deliver the strips in lengthwise succession on a conveyor, means to form and secure a tubular wrapper about the strips, means to compress the strips to the required cross-section while moving endwise on the conveyor, means to sever lengths from said strips, and means to select and remove those severed lengths containing portions of material from at least two different strips.

18. A machine for producing filter wads comprising in combination, a pair of cooperating severing elements to sever transverse strips of material from a stock and compress the longitudinal edges of the strips, a movable element to deliver the severed strips to a continuously moving wrapper, an element movable at substantially the same speed and in the direction of movement of said wrapper to impart a movement to said strips as they are delivered to the wrapper, folding elements operative to fold the wrapper about said strips, means to compress the strips to a substantially circular cross-section while moving endwise on the conveyor, adhesive applying elements to secure said wrapper and a severing device to sever lengths from the wrapped strips.

19. A machine for producing filter wads comprising in combination, a pair of cooperating severing elements to sever transverse strips of material from a stock and compress the longitudinal edges of the strips, a movable element to deliver the severed strips to a continuously moving wrapper, an element movable at substantially the same speed and in the direction of movement of said wrapper to impart a movement to said strips as they are delivered to the wrapper, folding elements operative to fold the wrapper about said strips, means to compress the strips to a substantially circular cross-section while moving endwise on the conveyor, adhesive applying elements to secure said wrapper, a severing device to sever lengths from the wrapped strips, and a selector element to select and remove those severed lengths containing portions of material from at least two different strips.

20. In a method of forming cigarette filter wads from a continuous web of compressible material which is extensible in the direction of the length of the web, the successive steps which comprise severing the web transversely to form elongated strips which are extensible in the direction of the width thereof, feeding said strips in the direction of the length thereof and simultaneously applying lateral pressure thereto to form rods of the desired cross-section, and thereafter severing the rods into lengths.

21. In a method of forming cigarette filter wads from a continuous web of compressible material which is extensible in the direction of the length of the web, the successive steps which comprise severing the web transversely to form elongated strips which are extensible in the direction of the width thereof, feeding said strips in the direction of the length thereof and simultaneously applying lateral pressure thereto to form rods of the desired cross-section, securing a wrapper about the rods, and thereafter severing the rods into lengths.

22. In a method of forming cigarette filter wads from a continuous web of compressible material which is extensible in the direction of the length of the web, the successive steps which comprise severing the web transversely to form elongated strips which are extensible in the direction of the width thereof, feeding said strips in the direction of the length thereof and simultaneously applying lateral pressure thereto to form rods of the desired cross-section, encasing said rods in a continuous wrapper, and thereafter severing the rods into lengths.

23. In a method of forming cigarette filter wads from a continuous web of compressible material which is extensible in the direction of the length of the web, the successive steps which comprise severing the web transversely to form elongated strips which are extensible in the direction of the width thereof, feeding said strips in the direction of the length thereof and simultaneously applying lateral pressure thereto to form rods of the desired cross-section, encasing said rods in end to end relation in a continuous wrapper, and thereafter severing the rods into lengths.

24. In a method of forming cigarette filter wads from a continuous web of compressible material which is extensible in the direction of the length of the web, the successive steps which comprise severing the web transversely to form elongated strips which are extensible in the direction of the width thereof, feeding said strips in the direction of the length thereof and simultaneously applying lateral pressure thereto to form rods of the desired cross-section, encasing said rods in axially spaced end to end relation in a continuous wrapper, and thereafter severing the rods into lengths.

25. In a method of forming cigarette filter wads from a continuous web of compressible material which is extensible in the direction of the length of the web, the successive steps which comprise severing the web transversely to form elongated strips which are extensible in the direction of the width thereof, feeding said strips in the direction of the length thereof and simultaneously deforming said strips to provide rods of the cross-section desired in the finished cigarette.

26. In a method of forming cigarette filter wads from a continuous web of compressible material which is extensible in the direction of the length of the web, said web comprising a plurality of layers of crepe paper, the successive steps which comprise severing the web transversely to form elongated strips which are extensible in the direction of the width thereof, feeding said strips in the direction of the length thereof and simultaneously applying lateral pressure thereto to form rods of the desired cross-section, and thereafter severing the rods into lengths.

27. In a method of forming cigarette filter wads from separate elongated strips of compressible material, the successive steps comprising feeding the strips in an endwise direction and simultaneously compressing the same transversely of the direction of feed to form the strips into rods, feeding a wrapper with and about said rods to encase the same, and severing the encased rods into lengths.

28. In a method of forming cigarette filter wads from separate elongated strips of compressible material which are extensible transversely of the length thereof, the successive steps comprising feeding the strips in an endwise direction in end to end relation and simultaneously compressing the same transversely of the direction of feed to form the strips into rods, feeding a continuous wrapper with and about said rods to encase the same, and severing the encased rods into lengths.

29. In a method of forming cigarette filter wads from separate elongated strips of multi-ply crepe paper having the corrugations extending in the direction of the length of the strips, the successive steps comprising feeding the strips in an endwise direction and simultaneously compressing the same transversely of the direction of feed to form the strips into rods, feeding a wrapper with and about said rods to encase the same, and severing the encased rods into lengths.

30. In a method of forming cigarette filter wads from separate elongated elements of fibrous material, the steps which comprise feeding a continuous wrapper web in the direction of the length thereof, feeding said elements in end to end relation on and with said web, deforming said elements to the desired cross-section, concurrently wrapping said web about said elements to form a continuous rod, and thereafter severing said rod into lengths.

31. In a method of forming cigarette filter wads from separate elongated elements of fibrous material, the steps which comprise feeding a continuous wrapper web in the direction of the length thereof, feeding said elements in end to end relation on and with said web, deforming said elements to the desired cross-section, concurrently wrapping said web about said elements, and applying adhesive to the web during continued feeding thereof to seal said web about said elements, thereby forming a filter rod.

32. In apparatus for forming cigarette filter wads, the combination with means for severing a web of fibrous material to form elongated strips having the long dimension thereof extending in a direction transverse of the web, of conveyor means receiving said severed strips and feeding the same in succession in the direction of the length of the strips, and means engaging the strips during the feeding thereof to deform and compress the same.

33. In apparatus for forming cigarette filter wads, the combination with means for severing a web of fibrous material to form elongated strips having the long dimension thereof extending in a direction transverse of the web, means for applying lateral pressure to said strips to deform and compress the same into rods, and means for severing said rods into lengths.

34. In apparatus for forming cigarette filter wads, the combination with means for severing a continuous web of multi-ply crepe paper having transverse corrugations so as to form elongated strips having lengthwise corrugations, of means for feeding said strips lengthwise in end to end relation and simultaneously compressing the same laterally of the direction of feed, and means for applying a single length of wrapper to a plurality of strips to form a filter rod.

35. In apparatus for forming cigarette filter wads, the combination with means for severing a continuous web of multi-ply crepe paper having transverse corrugations so as to form elongated strips having lengthwise corrugations, of means for feeding said strips lengthwise in end to end relation and simultaneously compressing the same laterally of the direction of feed, means for applying a single length of wrapper to a plurality of strips to form a filter rod, means for severing said rod into lengths, and means for isolating severed rod lengths containing a uniform supply of filter strip material from the remaining rod lengths.

36. In apparatus for forming cigarette filter wads, the combination with means for feeding a wrapper web in the direction of the length thereof, of means for delivering a series of separate elongated elements of filter material on said web in end to end relation, means engaging said elements during the movement thereof together with the web to deform the elements, means for encasing said elements in said web to form a rod, and means for severing said rod into lengths.

37. In apparatus for forming cigarette filter wads, the combination with means for feeding a wrapper web in the direction of the length thereof, of means for delivering a series of separate elongated elements of filter material on said web in end to end relation, means for encasing said elements in said web to form a rod, means for severing said rod into lengths, and means for isolating severed rod lengths uniformly loaded with filter material from the remaining lengths.

38. In a method of forming cigarette filter wads from separate elongated elements of fibrous material, the steps which comprise feeding a continuous wrapper web in the direction of the length thereof, moving said elements at substantially the linear speed of the web and in the direction in which the latter is fed and depositing the elements on the web in approximate axial alignment, deforming said elements to the desired cross-section, wrapping said web about said elements to form a continuous rod, and thereafter severing said rod into lengths.

39. In a method of forming cigarette filter wads from separate elongated strips of compressible material, the successive steps comprising feeding the strips in an endwise direction and simultaneously deforming the said strips to form the strips into rods of the desired cross-section, feeding a wrapper with and about said rods to encase the same, and severing the encased rods into lengths.

40. In a method of forming cigarette filter wads from separate elongated strips of compressible material which are extensible transversely of the length thereof, the successive steps comprising feeding the strips in an endwise direction in end to end relation and simultaneously deforming the said strips to form the strips into rods of the desired cross-section, feeding a continuous wrapper with and about said rods to encase the same, and severing the encased rods into lengths.

41. In a method of forming cigarette filter wads from separate elongated strips of multi-ply crepe paper having the corrugations extending in the direction of the length of the strips, the successive steps comprising feeding the strips in an endwise direction and simultaneously deforming said strips to form the strips into rods of the desired cross-section, feeding a wrapper with and about said rods to encase the same, and severing the encased rods into lengths.

42. In a method of forming filter wads from separate elongated elements of fibrous material, the steps which comprise feeding a continuous wrapper web in the direction of the length thereof, feeding said elements endwise in succession and in substantial alignment with one another on and with said web, deforming said elements to the desired cross-section, concurrently wrapping said web about said elements to form a continuous rod, and thereafter severing said rod into lengths.

43. In apparatus for forming cigarette filter wads, the combination with means for severing a continuous web of multi-ply crepe paper having transverse corrugations so as to form elongated strips having lengthwise corrugations, of means for feeding said strips lengthwise in succession and simultaneously deforming said strips to the desired cross-sectional shape and size, and means for applying a single length of wrapper to a plurality of strips to form a filter rod.

44. In apparatus for forming cigarette filter wads, the combination with means for severing a continuous web of multi-ply crepe paper having transverse corrugations so as to form elongated strips having lengthwise corrugations, of means for feeding said strips endwise in succession and simultaneously deforming said strips to the desired cross-sectional shape and size, means for applying a single length of wrapper to a plurality of strips to form a filter rod, means for severing said rod into lengths, and means for isolating severed rod lengths containing a uniform supply of filter strip material from the remaining rod lengths.

MOLINS MACHINE
COMPANY LIMITED,
*Assignee of Walter Everett Molins, Deceased,*
By J. H. FELL,
*Secretary.*